UNITED STATES PATENT OFFICE.

CLAUDE BOUCHER, AÎNÉ, OF COGNAC, FRANCE.

PROCESS OF MANUFACTURING BOTTLES, FLASKS, &c.

SPECIFICATION forming part of Letters Patent No. 656,876, dated August 28, 1900.

Original application filed February 21, 1899, Serial No. 706,374. Divided and this application filed January 2, 1900. Serial No. 157. (No specimens.)

*To all whom it may concern:*

Be it known that I, CLAUDE BOUCHER, Aîné, residing at Cognac, department of the Charente, in the Republic of France, have invented a new and useful Improvement in Processes of Manufacturing Bottles, Flasks, &c., which invention is fully set forth in the following specification.

The present invention comprises a novel process of manufacturing all kinds of bottles, demijohns, flasks, carafes, jars, and similar containers, or which, in short, is applicable to the production of most of the blown-glass articles obtainable by the ordinary procedure.

The object of the process is the production of superior articles of this class without the employment of skilled labor.

The present application for patent is a division and continuation of my application, Serial No. 706,374, filed February 21, 1899, which describes (without claiming) said process and also describes and claims apparatus designed specifically for carrying said process into effect.

The present invention consists in producing by any appropriate means hollow glass articles by first forming a charge of molten glass into a mass of suitable shape, then molding said charge to impart a definite shape to the bottom and the sides or a portion of the sides thereof while expanding the same by means of fluid-pressure internally applied, and then still further molding the blank thus formed to the shape of the finished article while further expanding it by internal application of fluid-pressure.

The invention further consists, specifically, in imparting to the blank a rotary motion while undergoing the final molding operation to avoid the formation of ribs or fins which may otherwise form at the meeting edges of the parts of the mold.

In carrying out the process the charge of glass of the quantity necessary for the fabrication of the desired article is measured in a suitable measuring-mold. This charge is then introduced into a second or intermediate mold, whereby a bulbous blank is obtained analogous to that made by the head workman in the ordinary process of glass-blowing when he rolls the glass on the marver or in a block. Finally, the partly-finished article is introduced into the third or finishing mold, wherein it receives its final shape, and during this stage of the process the article may be rotated to prevent the formation of ribs or fins, and thus insure a smooth exterior.

By means of this process articles of superior finish and appearance are obtained and the quantity of product is notably increased, these results being due mainly to the following causes: When, for example, two molds only are used for the mechanical fabrication of bottles, a good distribution of the glass is rarely obtained. Bright spots, or, in other words, very thin places, are produced on the sides, particularly when bottles of a certain length are made and when it is desired to elongate the partly-formed object in order to remove the roughnesses which form when the glass is emptied into the first mold. It is likewise difficult to obtain a proper distribution of the glass at the edge and bottom of the bottle. These various defects result in a lack of homogeneity in the mass of glass which constitutes the partly-formed object when it is withdrawn from the first mold. In fact, it is obvious that when the glass is emptied into the first mold the part which touches the neck and the shoulders is longer in contact with the mold than the glass which occupies a lower place in the bottle. Consequently when this first mold is opened the partly-formed object has solidified to a greater extent at the shoulder than in the other parts, and naturally the glass is drawn out irregularly; but, besides this, the interior glass, which, unlike that at the outside, has not been solidified by contact with the mold, escapes and falls to the bottom of the partly-formed object without possibility of restraining it, even when the object is sustained by the bottom of the finishing-mold or other analogous support during the elongation. In a word, by making the glass pass directly from the rough-mold into the finishing-mold a partly-formed object is obtained whose temperature and malleability are irregular, and this irregularity does not allow a uniform thickness to be given to the walls and to the bottom of the bottles. With a view to obviating these defects of manufacture I employ the step of intermediate molding whereby the glass ball or partly-formed object after it has been withdrawn from the first mold is brought to a shape approximately that of the finished article. By operating in this way the glass solidifies uniformly at the base and over the sides, and a veritable bulbous blank is obtained analogous to that made on the marver or in the block by the head workman when the ordinary processes of fabrication are employed.

When the bottle or other article is to bear raised or depressed characters and designs upon its surface, it is blown in the finishing-mold without movement relative thereto. Otherwise in order to prevent the formation of ribs or fins on the article it is subjected by any suitable means to a rotatory movement during the finishing operation.

The internal pressure applied to the blank during its transformation into a bottle or other article may be obtained by the use of compressed air or other expansible fluid and in any suitable way.

The described process is not limited to or dependent upon any specific mechanism and may obviously be practiced in many ways. I prefer, however, to employ the apparatus described in my above-mentioned application, to which reference is hereby made for a full description of means suitable for carrying out the process in a convenient, economical, and practical manner.

Having now described my said invention, what I claim is—

1. The process of mechanically producing hollow glass articles, consisting in first forming a charge of molten glass into a solid mass of suitable shape, then molding said charge to impart a definite shape to the bottom and sides or a portion of the sides thereof while expanding and rendering the same hollow by the action of internal fluid-pressure, and then further molding the blank thus formed to the shape of the finished article while expanding the same under action of further internal fluid-pressure.

2. The process of mechanically producing hollow glass articles consisting in first forming a charge of molten glass into a solid mass of suitable shape, then molding said charge while expanding and rendering the same hollow by the action of internal fluid-pressure, and then further molding the blank thus formed to the shape of the finished article while expanding the same under the action of further internal fluid-pressure, at the same time imparting movement to the blank for preventing the formation of ridges or fins thereon.

In testimony whereof I have signed this specification in the presence of two subscribing witnesses.

CLAUDE BOUCHER, Aîné.

Witnesses:
L. ELICHAGAREZ,
R. GAY DE LA CHARTRIE.